United States Patent [19]

Subramanian et al.

[11] Patent Number: 5,618,505
[45] Date of Patent: Apr. 8, 1997

[54] METHOD FOR CONVERTING LEAN-BURN ENGINE EXHUST GASES USING A TWO STAGE CATALYST SYSTEM

[75] Inventors: Somasundaram Subramanian, Melvindale; Robert J. Kudla, Warren; Mohinder S. Chattha, Northville, all of Mich.

[73] Assignee: Ford Motor Company, Dearborn, Mich.

[21] Appl. No.: 296,638

[22] Filed: Aug. 26, 1994

Related U.S. Application Data

[62] Division of Ser. No. 1,702, Jan. 7, 1993, abandoned.

[51] Int. Cl.$^6$ .................................................. B01D 53/94
[52] U.S. Cl. ................... 423/213.2; 423/213.5; 423/213.7; 423/239.1; 423/245.3; 423/247
[58] Field of Search ................. 423/213.2, 213.7, 423/213.5, 239.3, 245.3, 247; 502/314, 318, 320, 323

[56] References Cited

U.S. PATENT DOCUMENTS

| | | | |
|---|---|---|---|
| 3,656,915 | 4/1972 | Tourtellotte | 23/288 F |
| 4,374,103 | 2/1983 | Gandhi et al. | 423/213.5 |
| 4,520,124 | 5/1985 | Abe et al. | 502/159 |
| 4,833,113 | 5/1989 | Imanari et al. | 502/309 |
| 5,039,644 | 8/1991 | Lachman et al. | 502/208 |
| 5,176,897 | 1/1993 | Lester | 423/659 |
| 5,399,324 | 3/1995 | Subramanian et al. | 423/213.7 |

FOREIGN PATENT DOCUMENTS

| | | | |
|---|---|---|---|
| 0460507 | 12/1991 | European Pat. Off. | 423/213.7 |
| 3407291 | 9/1985 | Germany | 423/213.2 |
| 1384248 | 4/1972 | United Kingdom | 423/213.7 |

*Primary Examiner*—Gary P. Straub
*Assistant Examiner*—Timothy C. Vanoy
*Attorney, Agent, or Firm*—Lorraine S. Melotik

[57] ABSTRACT

The present invention broadly relates to a catalyst for promoting oxidation-reduction reactions of the exhaust gases produced by an internal combustion engine wherein the catalyst comprises a first-stage high temperature catalyst and a second-stage lower temperature catalyst. The first-stage catalyst comprises between about 0.1 and 3% by weight tungsten carried on a support material comprising mostly γ-alumina. The second-stage catalyst comprises a base metal catalyst carried on a support material and preferably comprises between 0.1 and 6% by weight copper carried on a support material comprising mostly γ-alumina.

24 Claims, 1 Drawing Sheet

△ 0.3% Cu / Al₂O₃
◇ 1% W / Al₂O₃ + 0.3% Cu / Al₂O₃

METHOD FOR CONVERTING LEAN-BURN ENGINE EXHUST GASES USING A TWO STAGE CATALYST SYSTEM

This is a divisional of application Ser. No. 08/001,702 filed Jan. 7, 1993 now abandoned.

BACKGROUND OF THE INVENTION

This invention is directed to a catalyst system comprising a first-stage high temperature catalyst and a second-stage lower temperature catalyst, for removing nitric oxides ($NO_x$), carbon monoxide (CO), and hydrocarbons (HC's) from exhaust streams of, e.g., lean-burn (less than stoichiometric amount of fuel) internal combustion engines.

A number of catalysts have been suggested to convert engine exhaust gas components like carbon monoxide (CO), hydrocarbons (HC), and nitrogen oxides ($NO_x$) into other gases. The first two are desirably oxidized to $H_2O$ and $CO_2$ while the nitrogen oxides present in the exhaust gas, generally nitric oxide, are desirably reduced to $N_2$. These so called "three-way" catalysts achieve simultaneous efficient (conversion> 80%) removal of CO, HC, and $NO_x$ when the fuel mixture of an internal combustion engine is slightly "rich" in fuel, i.e., in a narrow A/F ratio range between about 14.7 and 14.4, and the exhaust gas is slightly reducing. Such three-way catalysts are not efficient, however, in the reduction of $NO_x$ when engines are operated on the lean (reduced fuel) side where the A/F ratio is greater than 14.7, generally 19–27, and the exhaust gas is richer in oxygen. It is desirable, however, to operate engines on the lean side to realize a benefit in fuel economy, estimated to be in the range of 6–10%.

Considerable success has been achieved in the catalytic oxidation of unburned hydrocarbons and carbon monoxide, but the conversion of the nitrogen oxides has proven to be a much more difficult problem. This is because the reducing substances (such as CO or $H_2$) tend to react more quickly with the free oxygen, $O_2$, present in the exhaust gas than with the oxygen associated with nitrogen in $NO_x$.

Fujitani el al., in U.S. Pat. No. 5,041,270, suggest a lean-burn catalyst system comprising a single support having a first copper catalyst for reducing $NO_x$ to $N_2$ in the oxygen rich environment and a second oxidation catalyst comprising noble metals like Pd loaded on a porous support composed of, e.g., alumina for converting CO and HC. The use of the copper catalyst upstream of the noble metal oxidation catalyst is critical to this invention.

Subramanian et al., in application Ser. No. 07/772,410 filed Oct. 7, 1991 and entitled "Catalyst System for Converting Emissions of a Lean Burn Engine", similarly assigned as the present invention, describe a dual-bed catalyst system that comprises an acidic alumina catalyst (first stage) and a noble metal based oxidation catalyst (second stage).

The catalyst systems described have certain disadvantages. These include: a) relatively high cost associated with the use of precious metal catalysts, b) narrow operating temperature window because of the limited temperature range over which significant $NO_x$ removal is achieved, and c) either relatively low peak $NO_x$ conversion activity (acidic alumina) or poor durability (zeolite supported catlyst of Fujitani el al.).

It would be desirable to have a catalyst system particularly useful for lean-burn engines (oxygen rich exhaust situations) to effectively reduce $NO_x$ emissions and also provide high conversions for hydrocarbons and carbon monoxide. It would desirably allow for improved fuel economy. It would further be desirable if such a system would lower $NO_x$ emissions over a wider temperature range in comparison to other catalyst systems thereby offering more flexibility and convenience in determining catalyst location. If this system employed only base metals, it would additionally offer cost advantages over more expensive, conventionally used noble metal catalysts. The present invention provides such a system.

SUMMARY OF THE INVENTION

The present invention broadly relates to a catalyst for removal of $NO_x$, CO, and HC's from exhaust gases produced, e.g., by an internal combustion engine. The catalyst comprises a two-stage system comprising a first-stage catalyst and a second-stage catalyst. The exhaust gas may be automobile exhaust gas and the invention is adapted to be useful in lean-burn situations, i.e., with oxygen-rich environments. In such situations, the air to fuel ratio is generally 19–27.

The first-stage catalyst comprises between about 0.1 and 3% by weight tungsten carried on a support material comprising mostly γ-alumina. The first-stage catalyst is preferably made by impregnating the γ-alumina support material with a solution of a tungsten-containing compound in an aqueous or organic solvent, subsequently drying the impregnated γ-alumina and later calcining it to leave a coating of tungsten or tungsten oxide on the support material. The second-stage catalyst comprises base metal on support material. Preferably the base metal employed is selected from the group consisting of copper, cobalt, iron and manganese, and mixtures thereof. Preferably the support material comprises mostly γ-alumina and the second-stage catalyst comprises between about 0.1 ane 6% by weight base metal catalyst carried on the support material. This second-stage catalyst is preferably made by impregnating the support material with a solution of a base metal-containing compound in an aqueous or organic solvent, subsequently drying the impregnated support material and later calcining it to leave a coating of base metal or base metal oxide on the support material.

This invention according to another embodiment is directed to a method for the purification of exhaust gases which comprises sequentially exposing the two-stage exhaust gas catalyst system disclosed above to exhaust gases of, e.g., an internal combustion engine. This two-stage catalyst system widens the operating temperature window for $NO_x$ removal and eliminates the need for noble metal catalysts.

DETAILED DESCRIPTION OF THE PREFERRED EMBODIMENTS

This invention is directed to a two-stage system for the purification of exhaust gases containing nitrogen oxides, carbon monoxide, and hydrocarbons. It is particularly suitable for use with lean-burn internal combustion engines, such as automotive engines.

The exhaust temperature of the lean-burn engine depends on several factors, including A/F ratio, amount of exhaust gas recycled, spark advance used, and throttle valve position. The catalyst temperature depends on its location, i.e., the distance from the exhaust manifold.

Figure 1:
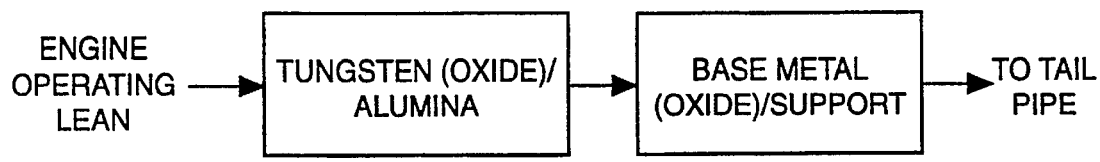
FIG. 1 schematically depicts an embodiment of the two-stage catalyst system according to the present invention.

In this catalyst system, the first-stage catalyst is placed close to the engine manifold (FIG. 1). It takes advantage of the warmer conditions and converts, primarily in the 400° to 700° C. range, $NO_x$ to $N_2$ based on its ability to catalyze the reaction between $NO_x$ and propane ($C_3H_8$) in the presence of $O_2$. Oxygen is a substantial component of the exhaust gas stream of lean-burn engines because lean-burn systems add more oxygen into the A/F mixture than is required for the complete combustion of the fuel. It also converts a portion of the HC's present to CO, $CO_2$, and $H_2O$ and a portion of $H_2$ to $H_2O$. Partial conversion of CO to $CO_2$ also occurs. The second-stage catalyst is placed further from the manifold (FIG. 1). It takes advantage of the relatively cooler conditions and is active in converting $NO_x$ to $N_2$ primarily in the 300° to 600° C. temperature range because of its ability to catalyze the reaction between $NO_x$ and $C_3H_8$ in the presence of $O_2$. The base metal catalyst is also highly effective in desirably oxidizing unreacted HC and CO to $CO_2$ and $H_2O$. CO and $H_2$ are present in the exhaust of a lean-burn engine and CO is produced by the $NO_x$ and $C_3H_8$ reaction over the first catalyst. The result of the system is the near quantitative conversion of hydrocarbons (HC), CO and $H_2$ to $CO_2$ and $H_2O$. Under this system, $NO_x$ conversions exceeding 91% were observed while simultaneously removing HC and CO.

The first-stage catalyst comprises mostly γ-alumina as a support material carrying tungsten or tungsten oxide. The support material is loaded such that the amount of tungsten is between 0.1 and 3% by weight of the entire catalyst (i.e., tungsten supported on alumina).

The tungsten is generally provided on the support by impregnating the γ-alumina support material with an aqueous or organic solution of a tungsten-containing compound. Exemplary of such compounds are ammonium metatungstate, metatungstic acid, tungstyl acetylacetonate, and tungsten hexahalides. Particularly preferred is ammonium metatungstate. Any tungsten-containing compound which is soluble in an aqueous or organic solvent and whose functional group is capable of being decomposed by heat to leave only tungsten or its oxide on the support material may be employed in this invention. Other tungsten compounds useful in this invention in addition to those listed above, will be apparent to those skilled in the art in view of this disclosure.

According to the method of impregnation disclosed above, the tungsten compound is dissolved generally by simply mixing the compound into an aqueous or organic solvent to make a solution thereof. Exemplary of such solvents are water, dilute solutions of acids and alkalis, alcohols, toluene, isopropyl alcohol, acetone, methylethylketone, butylacetate, and dimethylformamide. A solution of the tungsten compound is made as described above and is generally further diluted for impregnation. The catalyst solution may also comprise a mixture of compatible solvents and/or compatible tungsten compounds.

The dissolved tungsten compound is subsequently provided on a support material, which comprises mostly γ-alumina. This support material is particularly preferred because it has high surface area, good adhesion and low tungsten/support chemical interaction. By "mostly γ-alumina" is meant that the support material comprises more than about 50% by weight, more preferably greater than 80%, and most preferably substantially all γ-alumina. In addition to the γ-alumina, however, if desired the support may comprise other refractory materials like barium oxide, cerium oxide, lanthanum oxide, zirconium oxide, α-alumina, and titanium oxide.

"Support" is used herein to mean a material having a high surface area per unit volume and a good adhesion for catalyst applied thereto; "carrier" is used herein to mean the aggregation of support and catalytic compound excluding the carrier. A mechanical carrier is preferably comprised of a monolithic magnesium aluminum silicate structure (i.e., cordierite), although its configuration is not critical to the catalyst of this invention. The volume of the structure is measured by its exterior dimensions. It is preferred that the micropore volume of the silicate material be relatively low and the macropore volume provided by pores of diameter greater than 2000 angstroms be at least about 90%. The surface area of the carrier, as opposed to the material of which the structure is made, should be maximized consistent with pressure drop limitations for the particular application of the catalytic system of this invention. It is preferred that the surface area of the monolithic structure provide 50–1000 meter square per liter structure, as measured by $N_2$ adsorption. Cell density should be maximized consistent with pressure drop limitations and is preferably in the range of 200–800 cells per square inch of cross-sectional area of the structure.

Coating of the support material is carried out to impart preferably 0.1–3% by weight of tungsten based on the weight of the entire catalyst (including the support). The support material is generally employed in granular form, preferably has a particle size in the range of 20–100 mesh, although particle size is not critical. In the case of a granular support, a mixture of the granular material and solution is stirred at an elevated temperature, generally of about 75°–120° C. to evaporate the solvent. The impregnated support material is then heated to decompose and eliminate the functional group from the mixture, such as by heating to 320° C. for one hour and thereafter for four hours at 600° C. The coating may alternatively be put directly on a monolith coated with γ-alumina support material.

If the heating is carried out in air, the tungsten compound decomposes and forms tungsten oxide. If, on the other hand, the heating is carried out in a reducing atmosphere, the tungsten compound may be reduced to elemental tungsten. When the first-stage catalyst is placed in use, oxygen present in the exhaust gas will oxidize the tungsten to tungsten oxide.

The second-stage catalyst according to the present invention comprises base metal on support material such as alumina. Preferably the support comprises mainly γ-alumina as hereinbefore disclosed for the first-stage catalyst support material. Similarly, the support may also comprise minor proportions of other oxides such as ceria, titania, zirconia, lanthana, α-$Al_2O_3$, and barium oxide. The second-stage catalyst may instead, however, comprise zeolites exchanged with base metals. Preferably, the zeolite is ZSM-5. The zeolite may also comprise, e.g., other zeolites such as L, Y, Mordenite types.

The term "base metal" comprises transition metals (of the Periodic Table) other than noble metals and includes such metals as copper, cobalt, iron, manganese and chromium. Metal which are characterized as transition metals would be known to those skilled in the art with reference to the Periodic Table to include such groups as 8, 1B, and 2B. Although the preferred base metal is copper, other non-noble metal transition metals and their combinations may be used. Transition metals are incorporated into the catalyst by impregnating or exchanging the support material with solutions of transition metal containing compounds. This is done to incorporate preferably 0.1 to 6% by weight of the base metal catalyst, preferably being copper, based on the weight of the entire catalyst (including the support). Examples of such compounds, as will be apparent to those skilled in the art in view of the present disclosure, include base metal nitrates, acetates, sulfates, acetylacetonates, and amine chlorides.

For general discussion purposes, copper is hereinafter used as an exemplary base metal provided on γ-alumina support material. The copper is generally provided on the support by impregnating the support material with an aqueous or organic solution of a copper-containing compound. The support material is generally employed in granular form, and preferably has a particle size in the range of 20–100 mesh, although particle size is not critical. Exemplary of such copper compounds are copper nitrate, copper-acetate, copper sulfate, copper hexamine chloride, copper (II) amine nitrate, copper acetylacetonate, copper (II) tartrate. Particularly preferred copper compounds are copper acetate and copper nitrate. Any copper-containing compound which is soluble in aqueous or organic solvent and whose functional group is capable of being decomposed by heat to leave only copper or its oxide on the support material may be employed in this invention. Other copper compounds useful in this invention in addition to those listed above will be apparent to those skilled in the art.

If the support material is zeolite the base metal may be provided on the zeolite by ion-exchange and/or impregnation as will be apparent to one skilled in the art in view of the present disclosure. The base metal will be oxidized to base metal oxide in use as explained above for the tungsten catalyst. The supported base metal used in the second-stage catalyst may also be provided on a monolithic carrier. The considerations pertaining to monolithic carriers provided previously (in the case of the first-stage monolithic tungsten catalyst) apply here as well.

TEST PROCEDURE

The catalysts are characterized in a quartz flow reactor. Gases are blended in a manifold by means of mass-flow controllers and then routed either through a bypass line or through the reactor. The gases then flow to an analytical train for analysis. The post-catalyst gases are then analyzed to determine the extent of reaction on various constituents. The catalyst used may either be in the form of a cylindrical ceramic monolith measuring 0.75 inch in diameter or be powder samples. Total gas flow over the catalyst is 3.0 litres/minute.

EXAMPLE 1

According to an embodiment of making a second-stage catalyst according to the present invention, γ-$Al_2O_3$ (10 g, 20–40 mesh) is contacted (incipient wetness procedure) with 12 $cm^3$ of copper acetate solution of desired concentration. The resulting precursor is dried at 120° C. for one hour and then calcined at 500° C. for four hours. The resulting second-stage catalyst has a Cu loading of 0.3%.

A sample (2.8 g) of this second-stage catalyst is evaluated in the flow reactor using the following feed gas conditions: 1000 ppm NO, 40,000 ppm $O_2$, and 2050 ppm $C_3H_8$. The total gas flow rate is 3000 $cm^3$/minute. These conditions correspond to a space velocity of 38,570 $hr^{-1}$ based on packed density of 0.6 $g/cm^3$. The redox ratio R (ratio of the reducing to the oxidizing components in the feed gas), is 0.25. (R values less than one indicate fuel-lean conditions.) The NO conversion is shown as a function of temperature in FIG. 2. NO conversion in excess of 30% is observed in the 500° to 540° C. range and a peak NO conversion of 40% is observed at 520° C. The CO and HC conversions are close to 100% at temperatures greater than 551° C.

EXAMPLE 2

In order to form an embodiment of the first-stage catalyst according to the present invention system, γ-alumina (10 g, 20–40 mesh) is contacted with 12 $cm^3$ (incipient wetness) of aqueous ammonium meta-tungstate solution of desired concentration. The precursor is dried at 120° C. for one hour and then calcined at 600° C. for six hours. The resulting $WO_3$/γ-$Al_2O_3$ first-stage catalyst has a W weight loading of 1%.

A sample (2.8 g) of this catalyst is used in the first-bed position and a sample (2.8 g) of the catalyst described in Example 1 is used in the second-bed position to form a system according to the present invention. The catalyst system is evaluated using the feed gas described in Example 1.

Figure 2:
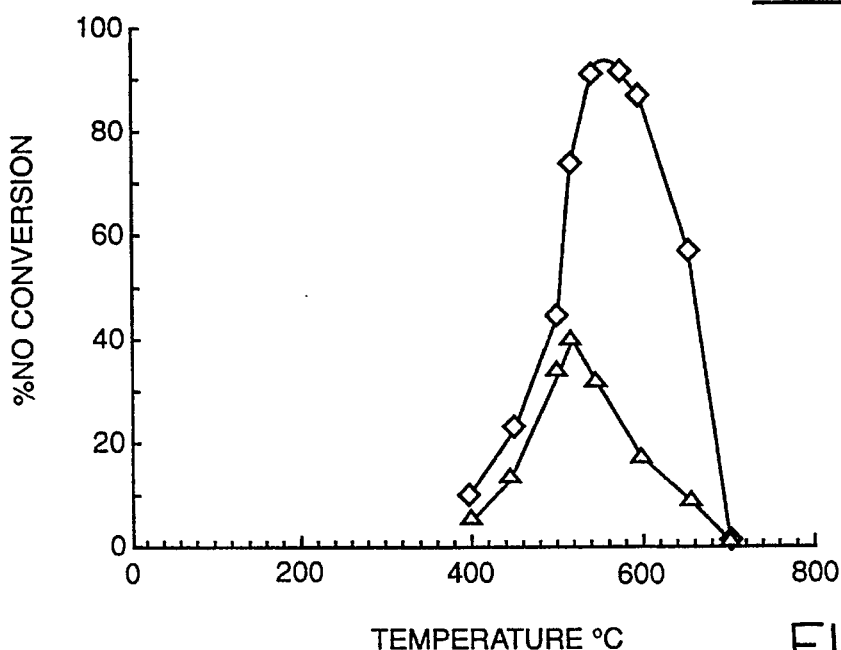
FIG. 2 is a graph showing the effect of catalyst temperature on NO conversion for a catalyst system according to an embodiment of the present invention as well for the second-stage of such system individually.

The NO conversion is shown as a function of temperature in the graph of FIG. 2. From the graph NO conversion in excess of 30% is observed in the 470° to 670° C. range and a peak conversion of 92% is observed around 562° C. When the catalyst temperature is lower than 500° C., removal of $NO_x$ primarily occurs over the Cu catalyst. At temperatures greater than 500° C., $NO_x$ removal primarily occurs over the W catalyst. In the 500°–550° C. temperature range, both catalysts convert significant amounts of $NO_x$ to $N_2$.

This W catalyst is optimally active in oxidizing hydrocarbons only at temperatures greater than 500° C. The presence of the Cu catalyst downstream allows HC removal at temperatures greater than 400° C. The HC and CO conversions approach 100% at temperatures greater than 554° C.

EXAMPLE 3

Figure 3:
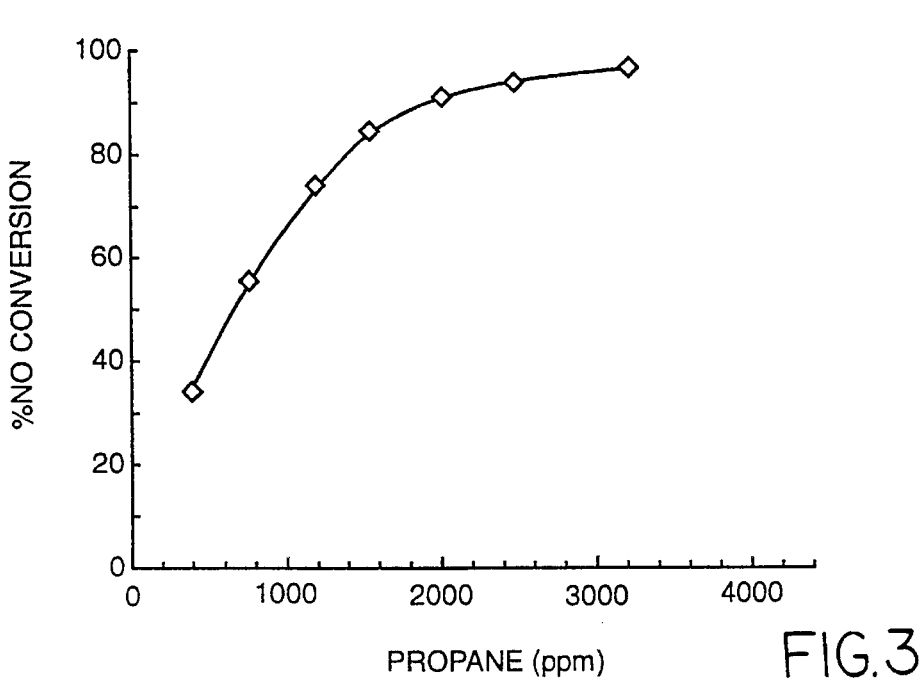
FIG. 3 is a graph showing the effect of $C_3H_8$ concentration on NO conversion for the catalyst system of FIG. 2.

The catalyst system described in Example 2 is tested at 580° C. using 1000 ppm NO and 40,000 ppm $O_2$. The $C_3H_8$ concentration is varied between 400 and 3000 ppm. The feed gas has $O_2$ in excess of that required for a stoichiometric mixture. The NO conversion is shown as a function of $C_3H_8$ concentration in FIG. 3. NO conversion increases with an increase in the $C_3H_8$ concentration.

EXAMPLE 4

A second-stage catalyst according to an embodiment of the present invention is made with meta-tungstic acid used in lieu of ammonium metatungstate following the procedure described in Example 2. The precursor is dried at 120° C. for one hour and then calcined at 600° C. for six hours. The resulting $WO_3$/γ-$Al_2O_3$ first-stage catalyst has a W weight loading of 0.1%.

This catalyst is used upstream of the Cu/γ-$Al_2O_3$ catalyst described in Example 1, and the catalyst system is evaluated under conditions described in Example 2. NO conversion in excess of 30% is observed in the 467° to 634° C. range and a peak NO conversion of 59% is observed at 559° C. The CO and HC conversions are close to 100% at temperatures greater than 546° C.

EXAMPLE 5

According to this example, a second-stage catalyst of the present invention is prepared from copper nitrate in lieu of copper acetate following the procedure described in Example 1. The precursor is dried at 120° C. for one hour and then calcined at 500° C. for four hours. The resulting Cu/γ-Al$_2$O$_3$ second-stage catalyst has a Cu weight loading of 0.3%.

This catalyst is used in downstream of the W/Al$_2$O$_3$ catalyst described in Example 2 and the catalyst system is evaluated under conditions described in Example 2. NO conversion in excess of 30% is observed in the 472° to 674° C. range and a peak conversion of 89% is observed at 565° C. The HC and CO conversions are close to 100% at temperatures greater than 552° C.

EXAMPLE 6

A first-stage catalyst according to the present invention is made in this example. Zirconium oxide (10 g, 20–40 mesh) is contacted with 8 cm$^3$ aqueous ammonium metatungstate solution of desired concentration. The precursor is dried at 120° C. for one hour and then calcined at 600° C. for six hours. The resulting WO$_3$/ZrO$_2$ first-stage catalyst has a W weight loading of 0.25%.

A sample (2.8 g) of this catalyst is used upstream of the Cu/γ-Al$_2$O$_3$ catalyst described in Example 1. The catalyst system is evaluated under conditions outlined in Example 2. No conversion in excess of 30% is observed in the 469° to 668° C. range and a peak NO conversion of 78% at 580° C. The CO and HC conversions approach 100% at temperatures greater than 564° C.

EXAMPLE 7

Samples of Cu/γ-Al$_2$O$_3$ (2.4 g) and W/γ-Al$_2$O$_3$ (3.2g) prepared in Examples 1 and 2, respectively, are evaluated under conditions described in Example 2. NO conversion in excess of 30% is observed in the 492° to 682° C. range and a peak NO conversion of 95% is observed at 570° C. The CO and HC conversions approach 100% at temperatures greater than 561° C. The CO and HC conversions approach 100% at temperatures greater than 561° C.

We claim:

1. A method for the conversion of lean-burn engine exhaust gases, nitrogen oxides, carbon monoxide, and hydrocarbons, which comprises sequentially exposing, to said exhaust gases of a combustion system, a first-stage catalyst comprising between about 0.1 and 3% by weight tungsten carried on a support material comprising mostly γ-alumina which effects reduction of said nitrogen oxides to nitrogen by reaction with hydrocarbons and a second-stage catalyst comprising base metal carried on a support material which effects further reduction of said nitrogen oxides to nitrogen by reaction with hydrocarbons.

2. The method according to claim 1 wherein said support material of said first-stage catalyst further comprises materials selected from the group consisting of barium oxide, cerium oxide, titanium oxide, lanthanum oxide, γ-alumina, and zirconium oxide.

3. The method according to claim 1 wherein the first-stage catalyst is made by impregnating said support material with a solution of a tungsten-containing compound in an aqueous or organic solvent, subsequently drying the impregnated support material, and then calcining it to leave a coating of tungsten or tungsten oxide on the support material.

4. The method according to claim 3 wherein the tungsten-containing compound is selected from the group consisting of ammonium metatungstate, mete tungstic acid, tungstyl acetylacetonate, and tungsten hexahalides.

5. The method according to claim 1 wherein said base metal is a transition metal.

6. The method according to claim 5 wherein said base metal is selected from the group consisting of copper, cobalt, iron, chromium, and manganese.

7. The method according to claim 1 wherein said second-stage catalyst comprises between about 0.1 and 6% by weight base metal carried on a support.

8. The method according to claim 1 wherein said second-stage catalyst is made by impregnating said support material with a solution of a base metal-containing compound in an aqueous or organic solvent, subsequently drying the impregnated support material, and then calcining it to leave a coating of base metal or base metal oxide on the support material.

9. The method according to claim 8 wherein said base metal-containing compound is selected from the group consisting of copper nitrate, copper acetate, copper sulfate, copper hexamine chloride, copper (II) amine nitrate, copper acetylacetonate, copper (II) tartrate.

10. The method according to claim 1 wherein said second-stage catalyst support comprises mostly γ-alumina.

11. The method according to claim 10 wherein said second-stage catalyst support further comprises materials selected from the group consisting of barium oxide, cerium oxide, titanium oxide, lanthanum oxide, γ-alumina, and zirconium oxide.

12. The method according to claim 1 wherein said exhaust gas is from an internal combustion engine.

13. The use of a two-stage catalyst system comprising a first-stage high temperature catalyst and a second-stage relatively lower temperature catalyst for promoting oxidation-reduction reactions of lean-burn engine exhaust gases, nitrogen oxides, carbon monoxide, and hydrocarbons, which use comprises:

providing in a lean-burn exhaust gas system the two-stage catalyst system comprising:
a first-stage catalyst comprising between about 0.1 and 3% by weight tungsten carried on a support material comprising mostly γ-alumina having catalytic reduction activity to effect reduction of said nitrogen oxides to nitrogen by reaction with hydrocarbons;
a second-stage catalyst comprising base metal carried on a support material having catalytic reduction activity to effect further reduction of said nitrogen oxides to nitrogen by reaction with hydrocarbons; and exposing said lean-burn engine exhaust gas to said second-stage catalyst after exposing said gas to said first-stage catalyst.

14. The use according to claim 13 wherein said support material of said first-stage catalyst further comprises materials selected from the group consisting of barium oxide, cerium oxide, titanium oxide, lanthanum oxide, γ-alumina, and zirconium oxide.

15. The use according to claim 13 wherein the first-stage catalyst is made by impregnating said support material with a solution of a tungsten-containing compound in an aqueous or organic solvent, subsequently drying the impregnated support material, and then calcining it to leave a coating of tungsten or tungsten oxide on the support material.

16. The use according to claim 15 wherein the tungsten-containing compound is selected from the group consisting of ammonium metatungstate, meta tungstic acid, tungstyl acetylacetonate, and tungsten hexahalides.

17. The use according to claim 13 wherein said base metal is a transition metal.

18. The use according to claim 17 wherein said base metal is selected from the group consisting of copper, cobalt, iron, chromium, and manganese.

19. The use according to claim 13 wherein said second-stage catalyst comprises between about 0.1 and 6% by weight base metal carried on a support.

20. The use according to claim 13 wherein said second-stage catalyst is made by impregnating said support material with a solution of a base metal-containing compound in an aqueous or organic solvent, subsequently drying the impregnated support material, and then calcining it to leave a coating of base metal or base metal oxide on the support material.

21. The use according to claim 20 wherein said base metal-containing compound is selected from the group consisting of copper nitrate, copper acetate, copper sulfate, copper hexamine chloride, copper (II) amine nitrate, copper acetylacetonate, copper (II) tartrate.

22. The use according to claim 13 wherein said second-stage catalyst support comprises mostly γ-alumina.

23. The use according to claim 22 wherein said second-stage catalyst support further comprises materials selected from the group consisting of barium oxide, cerium oxide, titanium oxide, lanthanum oxide, γ-alumina, and zirconium oxide.

24. The use according to claim 13 wherein said exhaust gas is from an internal combustion engine.

* * * * *